June 27, 1967     L. R. JOHNSON     3,328,071
VISOR FOR AUTOMOBILES
Filed July 6, 1964
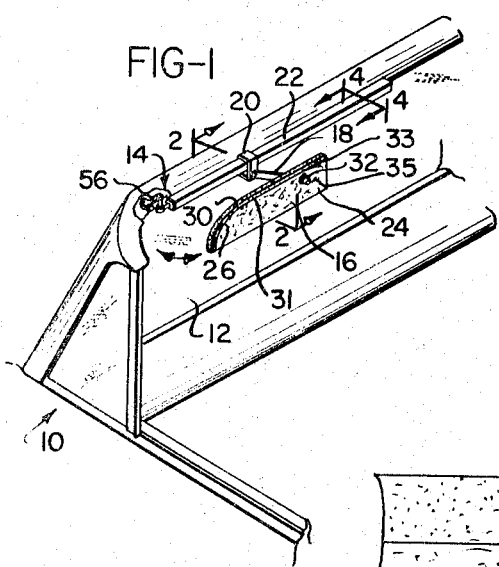
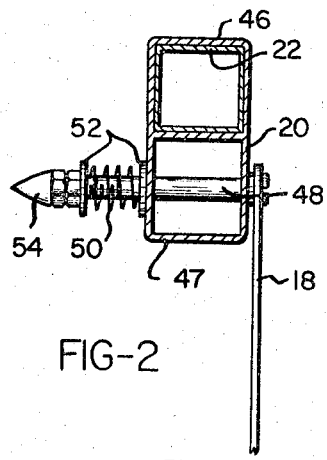
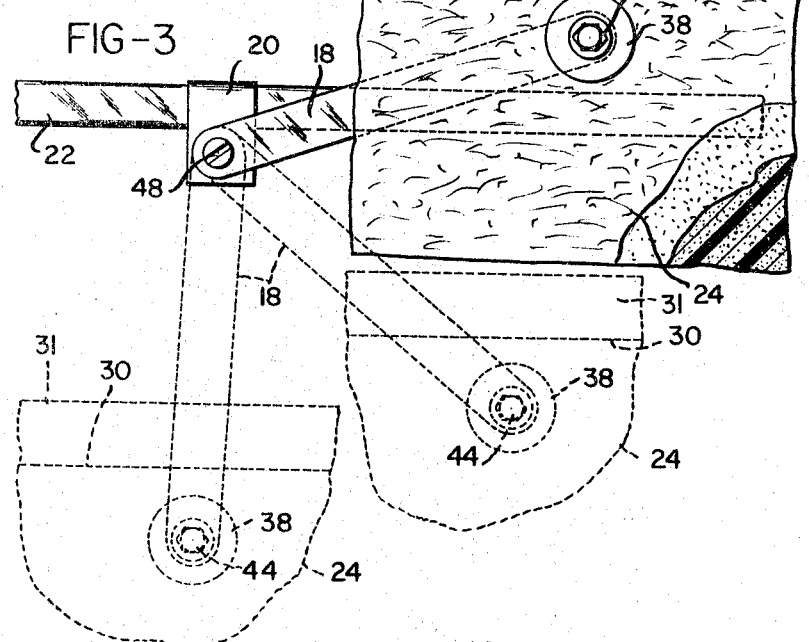
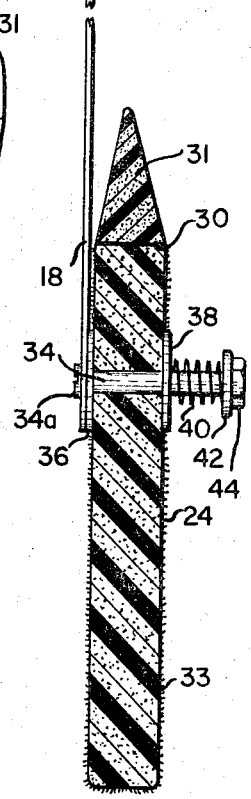
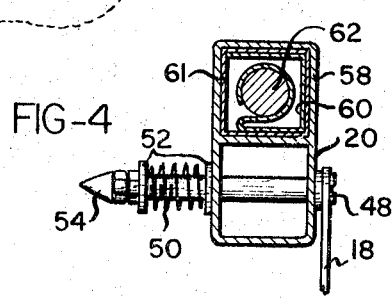
INVENTOR
LORIN R. JOHNSON
BY
Nilsson, Robbins & Anderson
ATTORNEYS United States Patent Office 3,328,071
Patented June 27, 1967

3,328,071
VISOR FOR AUTOMOBILES
Lorin R. Johnson, 3649 Westwood Blvd.,
Los Angeles, Calif. 90034
Filed July 6, 1964, Ser. No. 380,577
1 Claim. (Cl. 296—97)

The present invention relates to sun shields or visors for use in automobiles to protect the eyes of the driver, or other occupant, from intense light rays which interfere with vision.

For many years, somewhat standard automotive equipment has included a visor that is variously adjustable to protect the eyes of the occupants from intense light rays. Of course, insofar as the driver is concerned, the visor is an important article of safety equipment, serving to preserve his vision and thereby enabling safe operation of the vehicle. As for other occupants of the vehicle, visors are frequently important to provide reasonable comfort while traveling.

Although automobiles have been variously equipped with visors or eye shields for many years, these appliances often fail to provide an effective obstacle against light rays that interfere with vision. For example, the operator of a motor vehicle is sometimes blinded by the headlights of another vehicle reflecting light from a rear-view mirror which light is difficult to avoid without relocating the mirror and loosing all field of rear vision. Therefore, a need exists for a visor that may be effectively used to variously shield the automobile driver's eyes from light rays reflected by the rear view mirror.

Another difficulty generally present in prior automotive visors is that of effectively mating the visor to an interior surface of the automobile so as to completely block interfering light rays. That is, prior visors are often difficult to seat along a window edge for example, to close out disturbing light. Therefore, a need exists for a visor structure that may be easily and simply seated against various interior surfaces of the automobile to obstruct disturbing light rays that would otherwise reach the eyes of the driver or of other occupants of the automobile.

In addition to these considerations, a need also exists for a visor which has increased flexibility of use, so as to be readily positioned to cover a wide range of areas and thereby afford the driver and occupants of an automobile with greater protection from intense light rays, with the result of avoiding the annoying and sometimes dangerous situation in which the visor cannot be placed to effectively block vision-disturbing light rays.

An object of the present invention is to provide an automotive visor which may be installed as original equipment, or installed subsequently as an accessory unit, which visor is economical in manufacture, and effective in use to protect the eyes of occupants from intense light rays otherwise resulting in discomfort, if not dangerous impairment of vision.

Another object of the present invention is to provide an improved light-shielding visor, for automotive use, having increased flexibility to more-effectively shield the eyes of occupants (of less than average size) in an automobile, from various intense light rays, entering from any vertical angle at front or sides.

Another object of the present invention is to provide an improved light-shielding visor, for automotive use, having increased flexibility to more-effectively shield the eyes of occupants in an automobile from various intense light rays.

Another object of the present invention is to provide a visor as described, that can be readily positioned within or without various fields of vision of the vehicle occupants, by merely sliding the visor along one path of movement, or either in conjunction therewith or separate therefrom, rotationally displacing the visor about an axis of rotation internal the visor.

Still a further object of the present invention is to provide a visor that may be manufactured of expanded lightweight material, which incorporates an edge of resiliently-deformable material so as to be capable of being seated against the interior surfaces of a vehicle, and which visor may be effectively positioned to shield different areas by a cooperating mounting arrangement pivotally affixing the visor panel to an arm, the remote end of which is pivotally affixed to a slider that is carried on an elongate rod that may be in turn pivotally affixed to the interior of the vehicle.

These and other objects and advantages of the present invention will become apparent from a consideration of the following taken in conjunction with the drawing; wherein:

FIGURE 1 is a perspective view of a visor constructed in accordance with the principles of the present invention;

FIGURE 2 is a vertical sectional view taken along line 2—2 of FIGURE 1;

FIGURE 3 is a fragmentary front plan view of the structure of FIGURE 1, indicating a range of positions for the visor; and FIGURE 4 is a sectional view of a fragment of FIGURE 2, showing an alternative mounting structure of the present invention.

Referring initially to FIGURE 1, the interior of an automobile 10 is indicated showing the windshield and front closure. Above a section 12 of the windshield, there is mounted a visor structure 14 constructed in accordance with the present invention. In general the visor structure 14 includes a substantially-flat shield or shade member 16 pivotally affixed to a support arm 18, which is in turn pivotally carried on a slider 20 that rides on an elongate rod 22 and that is movably affixed to the interior of the automobile. The arrangement facilitates the movement of the flat shade member 16 to virtually any practical position so as to shade the eyes of the automobile occupant seated behind the windshield section 12.

Considering the structure as shown in FIGURES 1, 2 and 3 in greater detail, the visor structure 14 includes a substantially flat panel 24 of generally rectangular shape with an upper corner rounded to form a curved edge 26. In one embodiment of the present invention, molded polystyrene foam serves effectively in the body of the panel 24. However, other forms of expanded material, e.g. honeycombed aluminum may also be used to provide a light structure of sufficient rigidity for the panel 24. Affixed along the upper edge 30 and the curved edge 26 of the panel 24 is a strip 31 of resiliently-deformable material e.g. foam rubber. The strip 31 in one successful embodiment has a depth of approximately one inch into the shade member which may be affixed to the panel 24 either mechanically or by adhesives. The strip 31 serves as a flexible edge to mate the shade member 16 with various interior surfaces of the automobile 10 for effectively closing various segments of the automobile windows to thereby obstruct light rays. As an example, the strip 31 facilitates placement of the panel 24 in the upper left-hand corner of the windshield section 12 to fully obstruct glaring light rays. Further relative the shade member 16, it is to be noted that the panel 24 along with the strip 31 may be flocked or otherwise coated by various well-known methods, as with a fiber 33 to provide the appearance of an integral sheet of material of a desired color.

In the mounting of the visor, the holding arm 18 is affixed to the panel 24 at a location well interior of the strip 31, yet, removed from the center of the panel 24 in both dimensions of the plane occupied by the panel 24.

That is, the point 32 of attachment for the arm 18 to the panel 24 is offset toward the right end 35 of the panel from the vertical center and similarly offset toward the upper edge 33 from the horizontal center, just below edge 30.

In considering the structure of the pivotal joint between the panel 24 and the arm 18, reference is now made to FIGURE 2. A bolt 34 extends through the arm 18, a washer 36, the panel 24, a second washer 38, then through a coil spring 40 and another washer 42 to receive a nut 44. With the nut 44 turned down on the bolt 34, the panel 24 is gripped between the washers 36 and 38, by the force of the spring 40. Therefore, the arm 18 lying between the head 34a of the bolt 34 and the washer 36, is held positioned relative the panel 24 by the force of the spring 40 which may be readily overcome to move the panel to various desired positions.

The support arm 18 extends parallel from the flat shade member 16 to be affixed to a slider 20, shown in detail in FIGURE 2. The slider 20 is of generally rectangular configuration, providing an upper slide receptacle 46 defining a closed rectangular section which matingly receives the rod 22 in sliding relationship. Below the slide receptacle 46, the lower chamber 47 of the slider 20 transversely receives a bolt 48 passing through the arm 18, a washer 52, the slider 20 and emerging therefrom to pass through a coil spring 50 held between washers 52, and receive a lock nut 54. Thus, the slider 20 is clamped to the support arm 18 with a spring force applied to hold the arm 18 in any set position, but to permit relative pivotal motion of the arm 18 to variously position the shade member 16.

The slide receptacle 46 of the slider 20 receives the rod 22 as shown in FIGURE 1 and may be variously positioned thereon. The left end of the rod 22 is affixed to the automobile 10 by a universal bracket 56 movable in any direction (FIGURE 1) permitting the rod 22 to be variously positioned on a horizontal plane more than 90 degrees between windshield and side door window, and 360 degrees of rotation on its horizontal axis.

In the operation of assembling and mounting the structure as shown in the figures, the shade member may be variously constructed as previously described for example, of molded polystyrene and foam rubber, then the support arm 18 is fixed between the shade member and the slider 20. The slider 20 and the arm 18 may be formed of metal or plastic and variously cast or otherwise formed to provide a structure sufficiently rigid to support the shade member 16. The elongate rod 22 of substantially square cross-section which is received in the bracket 46 of the slider 20, may comprise a portion of a prior visor structure which is being replaced. If such is the case, the rod 22 universally affixed to the interior of the automobile 10 by the bracket 56 provides a readily available mounting for the structure of the present invention. However, in the replacement of some prior structures, a circular cross-section rod is provided connected to a bracket similar to bracket 56. In such instances, a hollow closed-channel tube 58 as shown in FIGURE 4 containing a section spring 60 may be slipped onto the circular rod 62 as shown, to provide an adaptation suitable for incorporation in a structure of the present invention.

Of course, in the event that the unit of the present invention is to be installed as original equipment for a motor vehicle, the universal bracket 56 along with various structures providing a sliding joint as shown in FIGURE 1 between the slider 20 and the rod 22 are variously possible.

In using the structure of the present invention, it is readily apparent that the two pivotal joints (at the slider 20 and at the point 32) permit the visor structure 14 to be variously raised and lowered to many positions as shown in FIGURE 3. This motion in cooperation with the slidable aspect of the structure, permits a wide range of positions for the panel 24 and thus effective use of the structure. Thus, the slider 20 may be easily traversed along the rod 22, which is oriented in a desired direction, then the shade member 16 may be raised or lowered to the desired position to effectively block interfering light rays. As a result, one important feature of the present invention resides in the consideration that the resiliently deformable strip 31 bordering the visor structure 14 permits an effective seating of the visor structure shade member 16, with various surfaces interior the automobile 10.

Another important feature of the present invention resides in the offset mounting of the shade member 16 on the arm 18 so as to accomplish more effective use of the shade member 16 to reach locations which might otherwise be out of reach for the shade member.

Another important feature of the present invention is the distinct advantage over any prior visor structures in the capability of the driver side visor to be positioned so as to extend and obstruct light passing through the other side of the car (rider's side).

These and other important features of the present invention are apparent from the embodiment described above and shown in the referenced figures; however, it is to be understood that the invention exemplified by the disclosure is not to be limited thereby, but rather is to be defined by the claim set forth below.

What is claimed is:

An automotive visor mechanism as to be mounted inside a motor vehicle contiguous to the windshield whereby to shield the eyes of occupants from intense light, comprising the combination of:
- an elongate rod means having one end freely pivotally affixed inside said motor vehicle whereby the other end of said elongate rod means may swing about said one end;
- a slider engaged with said elongate rod means to traverse said elongate rod means;
- a holder arm leaving one end pivotally affixed to said slider;
- a substantially flat shield structure pivotally affixed to the other end of said holding arm;
- spring-biased clamp means incorporated between said slider and said holding arm and also between said holding arm and said shield structure whereby said shield structure will retain various set positions; and
- a resiliently-deformable edge affixed to said shield structure for mating engagement between said shield structure and various surfaces within said vehicle.

References Cited

UNITED STATES PATENTS

| | | | |
|---|---|---|---|
| 1,477,312 | 12/1923 | Caskey | 296—97 X |
| 1,969,887 | 8/1934 | Flanary | 296—97 |
| 2,772,916 | 12/1956 | Jones | 296—97 |
| 3,085,827 | 4/1963 | Cederberg et al. | 296—97 |

FOREIGN PATENTS

| | | |
|---|---|---|
| 10,611 | 12/1932 | Australia. |
| 721,554 | 1/1955 | Great Britain. |
| 854,938 | 11/1960 | Great Britain. |

BENJAMIN HERSH, *Primary Examiner.*

J. A. PEKAR, *Assistant Examiner.*